May 25, 1971  R. W. HECKER, JR., ET AL  3,579,696
DOCKBOARD
Filed Dec. 30, 1968  3 Sheets-Sheet 1
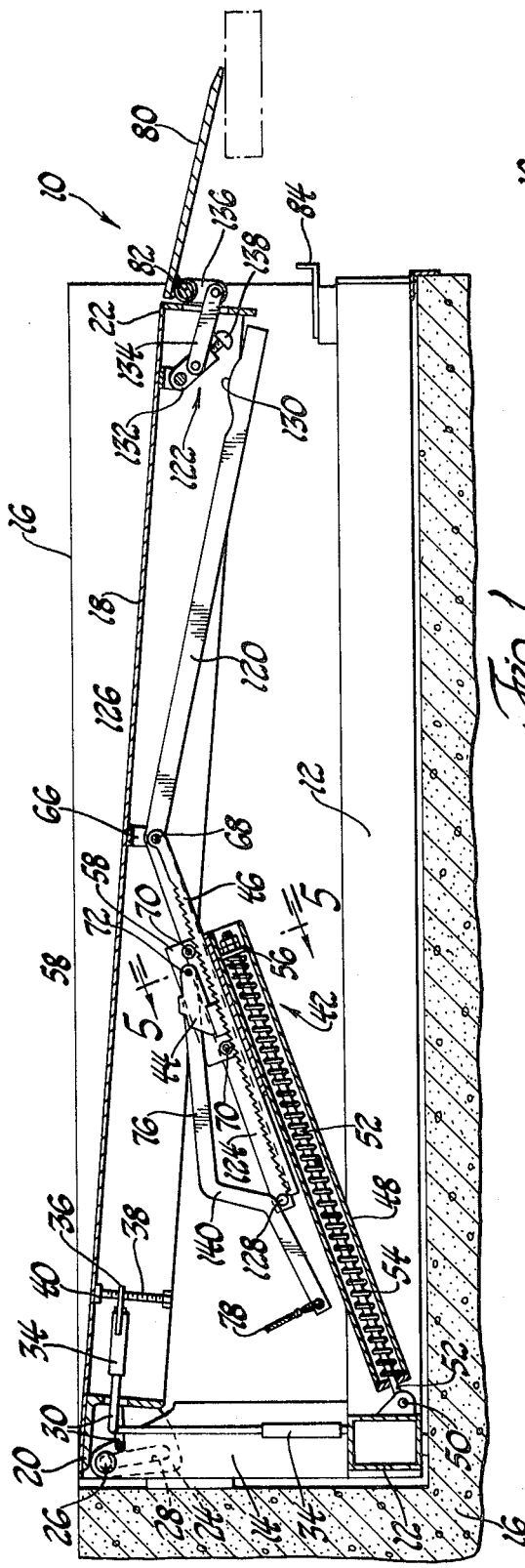
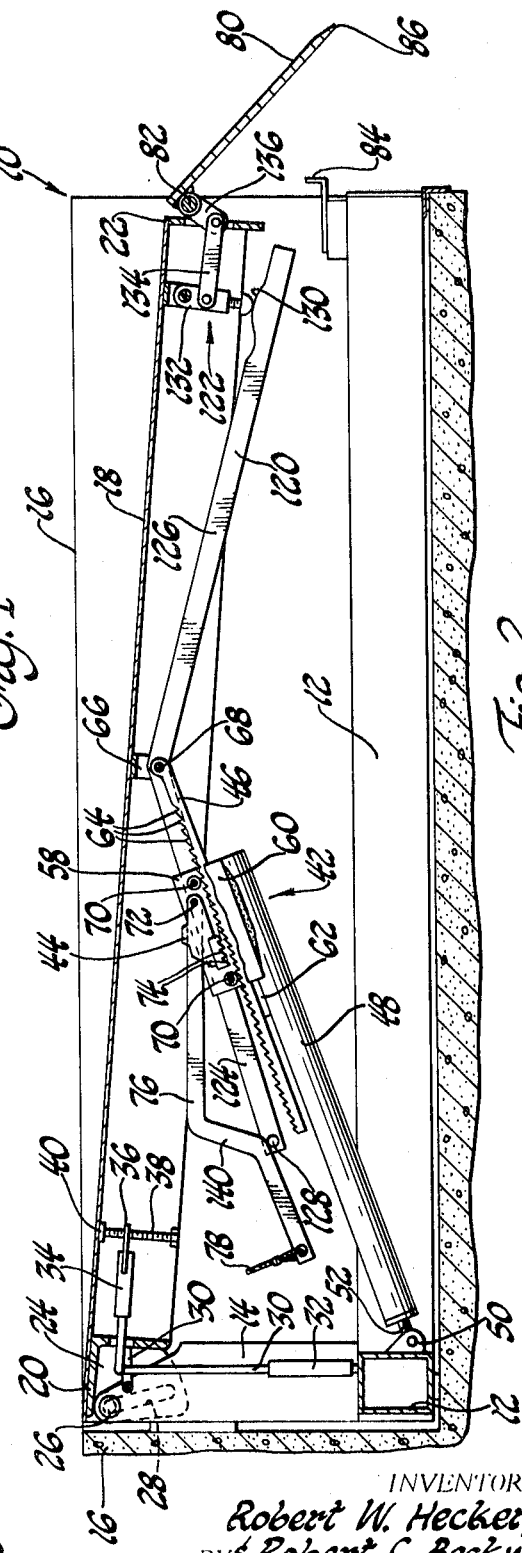
INVENTORS
Robert W. Hecker, Jr.,
Robert C. Beckwith
BY Barnard, McGlynn & Reising
ATTORNEYS

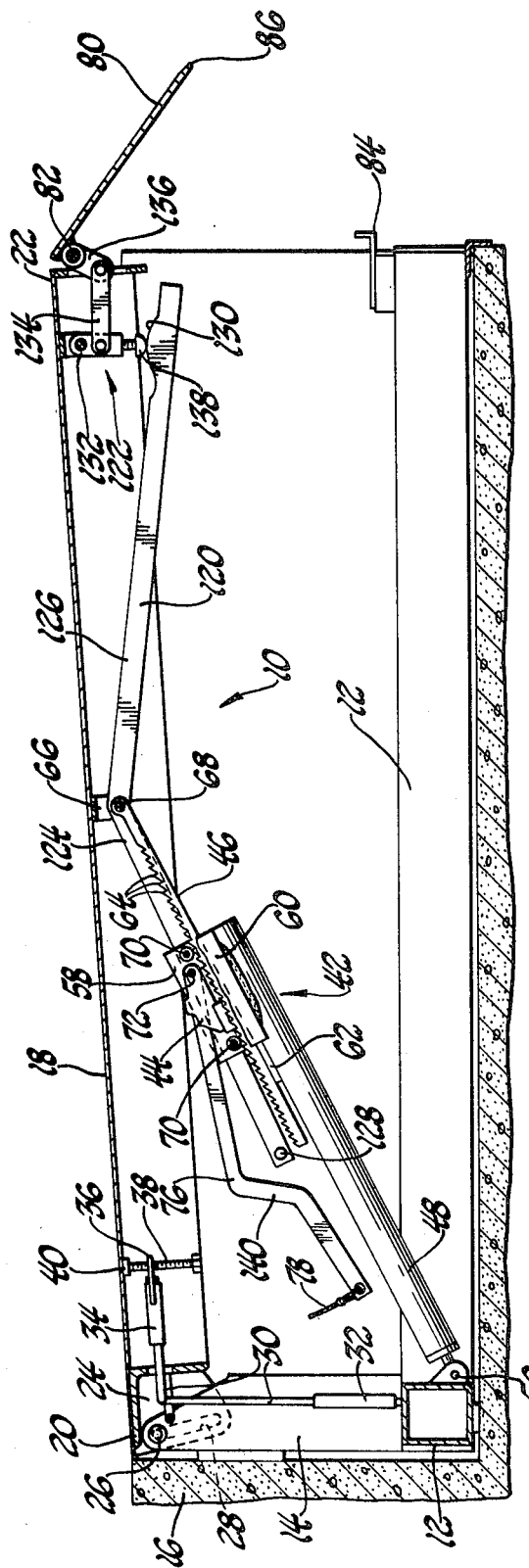

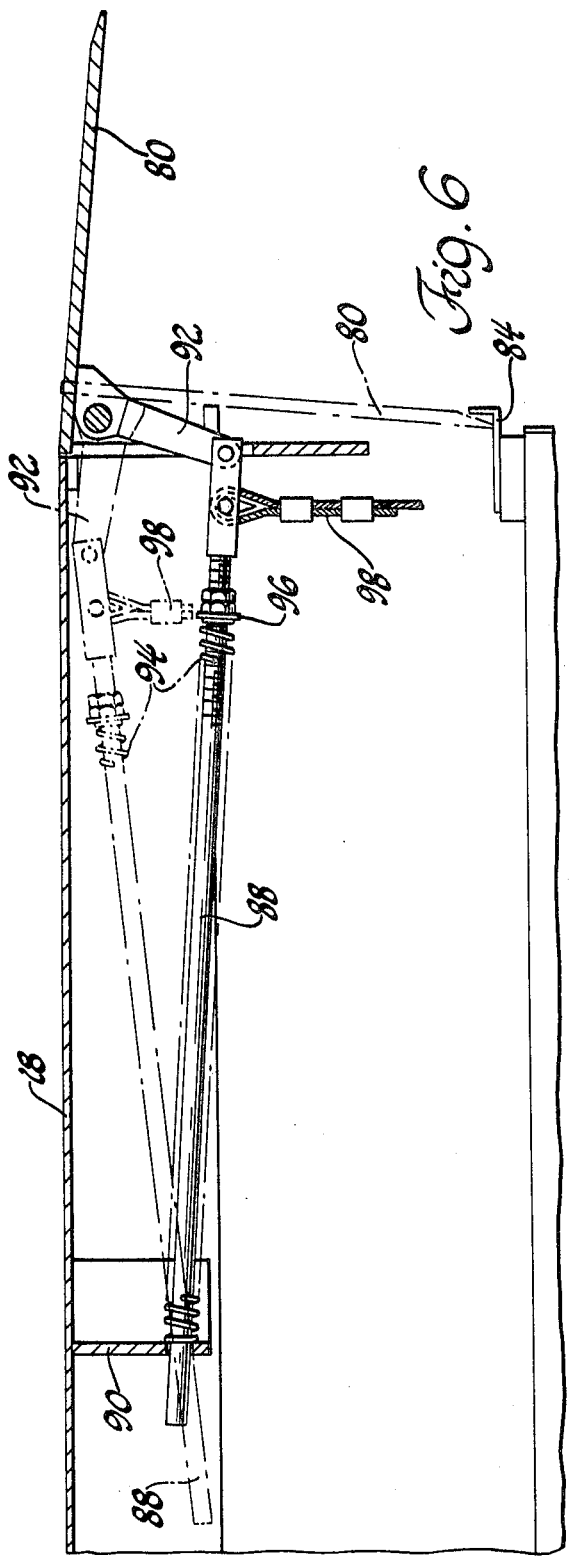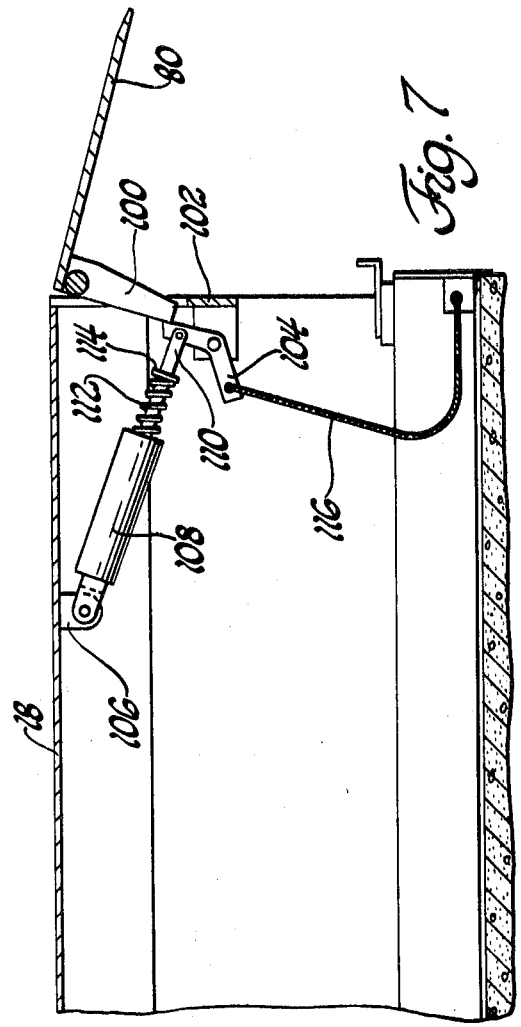

United States Patent Office 3,579,696
Patented May 25, 1971

3,579,696
DOCKBOARD
Robert W. Hecker, Jr., Clare, Mich., and Robert C. Beckwith, Milwaukee, Wis., assignors to Loomis Machine Company, Clare, Mich.
Filed Dec. 30, 1968, Ser. No. 787,652
Int. Cl. B65g *11/00*
U.S. Cl. 14—71                                    22 Claims

ABSTRACT OF THE DISCLOSURE

A dockboard assembly including a ramp pivotally connected to a support means and biasing means urging the ramp to pivot upwardly. A releasable holding means acts in opposition to the biasing means for restraining the biasing means from raising the ramp. A lip is pivotally connected to the ramp for pivotal movement between an extended position and a pendent position. The improvement is to include a control means responsive to the pivotal movement of the lip for releasing the holding means so that the ramp will automatically pivot upwardly.

---

This invention relates to a dockboard assembly of the type utilized in conjunction with a loading dock to facilitate the free movement of traffic between the loading dock and an adjacent vehicle, such as the bed of a truck, railroad car, or the like. Such dockboard assemblies are frequently disposed in a recess in the front of a concrete dock or the like and include a support furnace to which a ramp is pivotally connected. The ramp is pivotal between a below dock level position and a raised position above dock level. An extension lip is hinged to the front end of the ramp and hangs in a pendent position when the dockboard assembly is not in use and the ramp is in its so-called cross traffic or dock level position, in which position the ramp is flush with the upper surface of the dock. The lip is moved to an extended cantilevered position forming an extension of the ramp when the dockboard assembly is in use so that the lip may rest upon the bed of a truck or the like which is being loaded or unloaded.

The instant invention is specifically directed to a dockboard assembly of the type which is known as being "nose-light." A nose light dockboard assembly is one wherein a biasing means, which normally includes a plurality of springs or the like, urges the ramp to pivot upwardly with a sufficient force that the weight of the ramp does not overcome the biasing means. In order to fix the ramp in a desired position, a releasable holding means is normally included to act in opposition to the biasing means for restraining the biasing means from raising the ramp. A manually actuatable device is associated with the releasable holding means for releasing the holding means to allow the ramp to pivot upwardly as a result of the force applied thereto by the biasing means. The releasable holding means is automatically operable to allow the ramp to pivot downwardly when a sufficient force is applied thereto, such as by an operator walking onto the ramp. The dockboard assembly is normally stored with the ramp being substantially horizontal in the dock level position and supported against downward movement by the lip which is pendent and has its distal or downward end engaging a support. Since the distal end of the lip is engaged by a support when the dockboard assembly is in the stored position, traffic may move over the horizontal ramp without the ramp pivoting downward to a position below dock level.

In the operation of such a dockboard assembly, the holding means is normally manually released so that the ramp pivots upwardly. During this upward pivotal movement of the ramp, an appropriate mechanism pivots the lip from the pendent position towards the raised extended position and locks the lip in the extended position until the ramp is lowered, as by an operator walking onto the ramp, and the lip rests upon an adjacent vehicle, such as the bed of a truck. Once in this position, the distal end of the lip is supported in the extended position solely by resting upon the adjacent vehicle and the ramp is prevented from pivotting upwardly by the holding means. After the adjacent vehicle has been fully loaded or unloaded and moves away from the dock, the lip falls or pivots downwardly relative to the ramp from the extended position to the pendent position, but because of the holding means the ramp is prevented from pivoting upwardly and remains fixed so long as a weight sufficient to overcome the biasing means is not disposed on the ramp. If the ramp is an above dock level position when the vehicle moves away from the dock, an operator may walk onto the ramp to pivot it downwardly so that the distal or lower end of the lip will engage its support to stop downward pivotal movement of the ramp at and to support the ramp in the dock level position. The problem with such assemblies is, however, that very frequently the ramp is slightly below dock level when the truck moves away and remains there as the operator neglects to manually release the holding means and return the ramp to the cross traffic position with the lip supporting the ramp substantially horizontally. When the ramp is below dock level the distal or lower end of the lip is not supported and, therefore, when weight is placed upon the ramp, it is free to pivot downwardly. Serious accidents have occurred because of this in that fork lift trucks have been driven across ramps on the assumption that they were supported in the dock level position by the lip but were not, in fact, because the lower edge of the lip had not been disposed on its support, which, of course, results in the ramp pivoting downwardly under the weight of a fork lift truck—obviously a very dangerous situation.

Accordingly, it is an object and feature of this invention to provide an improved dockboard assembly including a nose light ramp and means for automatically pivoting the ramp to a position above dock level once the vehicle moves away from the dock.

It is another object and feature of this invention to provide a dockboard assembly having a ramp pivotally connected to a support means with biasing means urging the ramp to pivot upwardly and releasable holding means operative for restraining the biasing means from raising the ramp and a lip pivotally connected to the ramp for movement between an extended position and a pendent position and control means responsive to pivotal movement of the lip for releasing the holding means to allow the ramp to pivot upwardly.

In correlation with the foregoing object and feature, it is another object and feature to include in the control means an adjustment means for adjusting the amount of pivotal movement of the lip over which said holding means is released thereby controlling the maximum amount of upward pivotal movement of the ramp in response to pivotal movement of the lip.

In correlation with the foregoing objects and features, it is another object and feature to include in the control means limit means for preventing the release of the holding means in response to pivotal movement of the lip when the ramp is pivoted upwardly to a predetermined position.

Other objects and attendant advantages of the present invention will be readily appreciated as the same becomes better understood by reference to the following detailed description when considered in connection with the accompanying drawings wherein:

FIG. 1 is a cross sectional view of a preferred embodiment of the instant invention showing the lip extended and the ramp below dock level;

FIG. 2 is a view similar to FIG. 1 and showing the lip pivoting toward the pendent position and the holding means released so that the ramp may pivot upwardly;

FIG. 3 is a view similar to FIGS. 1 and 2 with the ramp in a predetermined position above dock level whereat pivotal movement of the lip does not affect release of the holding means whereby the ramp remains in a fixed position as the lip pivots;

FIG. 4 is a fragmentary cross sectional plan view particularly showing the biasing means which urges the ramp to pivot upwardly;

FIG. 5 is an enlarged cross sectional view taken substantially along line 5—5 of FIG. 1; and FIGS. 6 and 7 are fragmentary cross sectional views taken in parallel planes disclosing means for pivoting the lip to the extended position and for locking the lip in the extended position until the lip is disposed upon an adjacent vehicle.

Referring now to the drawings wherein like numerals indicate like or corresponding parts throughout the several views, a dockboard assembly constructed in accordance with the instant invention is generally shown at 10.

The assembly includes a support means comprising the structural members 12 and the uprights 14 and disposed within a recess in a concrete dock 16.

The assembly includes a ramp 18 pivotally connected adjacent a first end 20 thereof to the upright members 14 of the support means. The ramp 18 extends from the first end 20 to a second end 22. On each side of the dockboard assembly there is included a pair of parallel uprights 14 and the ramp 18 has a pair of plates 24 extending therefrom and disposed between the respective pairs of uprights 14. Pins 26 extend between each pair of uprights 14 and are disposed in an elongated slot 28 in each of the plates 24. The slots 28 are elongated to allow the ramp 18 to tilt in a lateral direction.

The dockboard assembly also includes biasing means comprising the torsion bars 30 for urging the ramp 18 to pivot upwardly. The torsion bars 30 preferably are made of solid spring steel, prestressed to press upwardly against the ramp 18 when disposed in the stressed position as shown in the drawings. Vertically elongated tubular sockets 32 are secured to the inwardly disposed uprights 14 and receive the downturned ends of the respective torsion bars 30. The torsion bars 30 extend upwardly from the sockets 32 and are turned inwardly or forwardly to engage the undersurface of the ramp 18. The opposite ends of the torsion bars 30 are disposed in the members 34 which are in turn secured to the plates 36. Bolts 38 are rotatably supported by the sockets 40 and threadedly engage the respective plates 36 so that upon rotation of the bolts 38, the pressure of the torsion bars against the ramp 18 may be adjusted. The torsion bars 30 provide a sufficient upwardly directed force to raise the ramp 18 against the force resulting from the weight of the ramp 18.

The dockboard assembly 10, therefore, also includes releasable holding means, generally indicated at 42, operative to act in opposition to the torsion bars 30 of the biasing means for restraining the torsion bars 30 from raising the ramp 18. The holding means 42 includes first and second locking members 44 and 46 respectively which coact to prevent the ramp 18 from being raised and which automatically allow the ramp 18 to pivot downwardly in response to a predetermined downward force applied thereto.

Also included is an anchor means including a cylinder 48 which is pivotally connected at 50 to the member 12 of the support means. The cylinder 48 has a yieldable connection with the support means through a stem 52 about which is disposed a compression coil spring 54. One end of the stem 52 is pivotally connected to the support means at 50 and the opposite end is provided with a shoulder or abutment 56 which receives the thrust of the spring 54. The other end of the spring 54 bears against the end wall of the cylinder 48.

The anchor means also includes spaced and parallel plates 58 and 60 respectively. The plates 58 and 60 are welded or otherwise secured to the cylinder 48. A slide strip 62, of brass or the like, is disposed between the plates 58 and 60. The second locking member 46 is elongated and includes ratchet teeth 64. The second locking member 46 is slidably disposed between the plates 58 and 60 and slides upon the slide strip 62. The second locking member 46 is pivotally connected to the ramp 18 by a bracket 66 and a pin 68. A pair of rollers 70 are secured between the plates 58 and 60 to maintain the second locking member 46 in position against the slide strip 62 whereby the second locking member 46 is movably supported by the anchor means. The first locking member 44 is movably supported between the plates 58 and 60 by being pivotally supported by the pin 72. The first locking member 44 has ratchet teeth 74 which coact with the ratchet teeth 64 on the second locking member 46. The cylinder 48, the plates 58 and 60, and the associated structure, therefore, define the anchor means which movably supports the first and second locking members 44 and 46.

A lever 76 is attached to the first locking member 44 for moving the locking member 44 out of locking engagement with the second locking member 46 to allow the ramp 18 to pivot upwardly as a result of the biasing action provided by the torsion bars 30. There is included a manually actuatable means comprising the cord 78 which, although not shown, extends to a position where it is accessible from the dock's upper surface and is connected at its other end to the lever 76 for manually releasing the holding means 44 so that the ramp 18 will pivot upwardly. The lever 76 is connected to the first locking member 44 for moving the ratchet teeth 74 thereof into and out of engagement with the ratchet teeth 64 on the second locking member 46. In the preferred embodiment a spring is associated with the first locking member 44 and/or the lever 76 for urging the ratchet teeth 74 ratchet teeth 64 of the second locking member 46. The ratchet teeth 64 of the second locking member 16. The ratchet teeth 64 and 74 are angled so that the locking members 44 and 46 may move relative to one another as the ramp is pivoted downward but may not move relative to one another in the opposite direction, except by movement of the first locking member 44 by the lever 76. In other words, in moving the ramp 18 downwardly, the second locking member 46 will move downwardly through the plates 58 and 60 to pivot the first locking member 44 upwardly.

The dockboard assembly also includes a lip 80 pivotally connected through a piano-type hinge 82 to the second or front end of the ramp 18 for pivotal movement between an extended position, as illustrated in FIG. 1, and a pendent position in which the lip 80 is substantially perpendicular to the ramp, as illustrated in phantom in FIG. 6. The support means also includes the support platform means 84 for receiving the outward, downward or distal end 86 of the lip so that the ramp 18 may be supported in the substantially horizontal or dock level position while being stored.

Turning now to FIGS. 6 and 7, there is disclosed means for pivoting the lip 80 to the extended position and for locking the lip in the extended position until the lip is disposed upon an adjacent vehicle, such as the bed of a truck which is shown in phantom in FIG. 1. As illustrated in FIG. 6, a shaft 88 is slidably disposed in a bracket 90, which depends from the ramp 18, and is pivotally connected at its opposite end to a crank arm 92. A spring 94 reacts between the bracket 90 and a shoulder 96 for urging the shaft 88 to move to the right as viewed in FIG. 6. A cord 98 is connected to the shaft 88 at one end and is connected to the structure of the support means at the other end. The crank arm 92 is rotatable about the axis of the hinge 82 and engages the underside of the lip 80, i.e., the crank arm 92 is pivotal relative to the lip 80. When in the storage position, the lip 80 is normally in the pendent position illustrated in phantom in FIG. 6, in which position the lip is supported by the platform means 84. The shaft 88 is normally in the position illustrated in phantom in FIG. 6 with the pivotal connection between the shaft 88 and the crank arm 92 being disposed adjacent the underside of the ramp 18. When the holding means 42 is released, the torsion bars 30 pivot the ramp 18 upwardly and in so doing the cord 98 becomes taut to pull the shaft 88 and the crank arm 92 overcenter so that the spring 94 and the cord 98 coact to urge the crank arm 92 into engagement with the lip 80 to raise the lip 80 to the extended position illustrated in full lines in FIG. 6.

Turning to FIG. 7, there is disclosed an arm 100 which is secured to the lip 80 so as to rotate therewith. A plate 102 extends downwardly from the front end of the ramp 18 and through another plate secured perpendicularly thereto pivotally supports a bell crank 104. A bracket 106 is secured to the underside of the ramp and depends therefrom a cylindrical member 108 is pivotally connected to the bracket 106 and a plunger 110 is slidably disposed in the cylinder 108 and is biased out of the cylinder 108 by a spring 112 which reacts between the end of the cylinder 108 and a shoulder 114. The opposite end of the plunger 110 is pivotally connected to the bell crank 104. A cord 116 is attached to one end to the bell crank 104, and at the other end to the support means. When the ramp is in the stored position and the distal end 86 of the lip 80 is supported by the platform means 84, the arm 100 is disposed adjacent the underside of the ramp 18 and the bell crank 104 is in a position engaging or closer to the plate 102. When the ramp pivots upwardly and the lip 80 is pivoted towards the extend position, the arm 100 moves past the bell crank 104 and the bell crank 104 is pivoted, by the cord 116 and against the action of the spring 112, to the position shown in full lines in FIG. 7. The bell crank 104 is in the position shown in solid lines in FIG. 7 as the ramp is initially pivoted downwardly and the strength of the spring 94 is not sufficient to support the weight of the lip; therefore, as slack occurs in the cord 98, the lip 80 begins to pivot downwardly until the arm 100 engages the bell crank 104. When the arm 100 engages the bell crank 104, the spring 112 is compressed and the lip 80 is supported in the extended position. Once the ramp 18 is pivoted downwardly so that the lip 80 engages an adjacent vehicle, such as the bed of a truck shown in phantom in FIG. 1, the lip 80 is pivoted upwardly toward a more extended position to move the arm 100 out of contact or engagement with the bell crank 104 whereupon the bell crank 104 is pivoted to the position engaging or closer to the plate 102 under the action of the spring 112. Once the vehicle moves away from the dock so that the lip 80 is no longer supported by the vehicle, the lip 80 pivots toward the pendent position and moves the shaft 88 and the crank arm 92 back to the position shown in phantom in FIG. 6.

It will be understood by those skilled in the art upon completing the remaining description that various holding means and various means for raising and locking the lip so may be utilized in the instant inventive combination. In fact, the holding means and the means for raising and locking the lip as disclosed herein are not per se novel.

The dockboard assembly also includes control means responsive to pivotal movement of the lip 80 for releasing the holding means 42. The control means includes a first member 120 for releasing the holding means 42 and linkage means, generally indicated at 122, for moving the first member 120 during a predetermined portion of the pivotal movement of the lip 80 between the extended and pendent positions. The first member 120 is pivotally connected to the ramp 18 by being rotatably supported on the shaft 68 coaxially with the second locking member 46. The first member 120 has a rearwardly extending arm 124 on one side of the pivotal connection to the ramp 18 and a forwardly extending arm 126 on the other side of the pivotal connection to the ramp.

The arms 124 and 126 of the first member 120 are disposed at an angle between 90 and 180 degrees relative to one another and the rearwardly extending arm 124 extends in a direction generally parallel to the second locking member 46. The rearwardly extending arm 124 terminates at a first end which includes a pin 128 extending therefrom for engaging the lever 76, as shown in FIGS. 1 and 2. The forwardly extending arm 126 terminates in a second end which includes a cam surface 130.

The linkage means 122 includes a first link 132 pivotally connected to the underside of the ramp 18 and depending therefrom for pivoting the first member 120. A second link 134 pivotally interconnects the first link 132 and the lip 80 for pivoting the first link 132 upon pivotal movement of the lip 80. The second link 134 is connected to an extension 136 which is in turn secured to the lip 80 for movement therewith.

There is also included an adjustment means comprising the abutment 138 which is movably connected to the lower end of the first link 132 and is engageable with the cam surface 130 of the first member 120. The movable abutment 138 threadedly engages the first link 132 so that upon rotation thereof the distance the abutment 138 is disposed from the end of the link 132 may be adjusted for adjusting the amount of movement of the first member 120 in response to movement of the lip 80. That is to say, the movable abutment 138 is an adjustment means for adjusting the amount of pivotal movement of the lip 80 over which the holding means 42 is released. As illustrated in FIG. 1, the movable abutment 138 is not in engagement with the first member 120, and therefore, initial downward pivotal movement of the lip 80 is not effective to release the holding means 42; however, if the movable abutment 138 were to be adjusted to increase its extension from the first link 132, engagement thereof with the first member 120 would occur earlier during downward pivotal movement of the lip 80. The longer the holding means 42 is released the greater will be the pivotal movement of the ramp 18.

The control means also includes limit means comprising the offset cam portion 140 in the lever 76 for preventing the release of the holding means 42 in response to the lip 80 when the ramp 18 has pivoted upwardly to a predetermined position. In other words, the offset cam portion 140 prevents the engagement of the lever 76 by the pin 128 at the first end of the first member 120 when the ramp 18 has pivoted upwardly to a predetermined position, such as that illustrated in FIG. 3 (which is exaggerated in scale for clarity).

In operation, the dockboard assembly is normally stored with the ramp 18 in the substantially horizontal or dock level position and supported there by the lip 80 which has its lower or distal end 86 supported by the platform means 84. In the dock level position, traffic may safely move along the dock and over the ramp 18 because the lip 80 supports the ramp in the dock level position, it being remembered that the holding means 42 will allow the ramp 18 to pivot downwardly in response to a predetermined force. The cord 78 is manually pulled to move the lever 76 to disengage the first locking member 44 from the second locking member 46 to allow the ramp 18 to pivot upwardly under the biasing action of the torsion bars 30. As the ramp 18 is pivoted upwardly, the means shown in FIGS. 6 and 7 pivots the lip to the extended position and locks the lip in the extended position. Thereafter, the ramp 18 is lowered, as by an operator walking thereupon, so that the lip 80 rests upon a vehicle adjacent the dock whereupon the lip 80 is no longer locked or held in the extended position. After the loading or unloading of the vehicle adjacent the dock is accomplished, the vehicle moves away from the dock and the lip 80 pivots under its own weight toward the pendent position. As the lip 80 pivots toward the pendent position, the first link 132 is pivoted so that the abutment 138 engages the cam surface 130 of the first member 120. The engagement of the abutment 138 with the cam surface 130 pivots the first member 120 so that the rearwardly extending arm 124 thereof moves upwardly to engage the pin 128 with the lever 76 to disengage the first locking member 44 from the second locking member 46. When the first locking member 44 is disengaged from the second locking member 46, the ramp 18 pivots upwardly under the biasing action of the torsion bars 30. The ramp 18 will continue to pivot upwardly until the abutment 138 moves past the bulbus of raised portion of the cam surface 130 whereat the first locking member 44 reengages the second locking member 46 to prevent further upward movement of the ramp 18. This position is one where the ramp 18 is above the dock level position so that upon downward movement of the ramp 18 the lip 80 will surely engage and be supported by the platform means 84.

It is possible that the ramp 18 be disposed in an above dock level position or a very high position in loading and unloading a vehicle so that upon movement of the lip 80 towards the pendent position as the vehicle moves away, the holding means 42 would be released and the ramp 18 would pivot even further upwardly to an inappropriately high position. In order to overcome such a situation, the limit means comprising the offset cam portion 140 prevents the release of the holding means 42 by the first member 120 when the ramp has pivoted upwardly to a predetermined position, which is not very far above dock level. This is accomplished in that as the ramp 18 pivots upwardly, the pin 128 on the rearwardly extending arm 124 of the first member 120 moves to the right as illustrated in FIG. 3 relative to the lever 76. As illustrated in FIG. 3, the lip 80 is in its mid position in traveling toward the pendent position so as to have pivoted the first member 120, yet the pin 128 does not engage the lever 76 and the holding means 42 is, therefore, not released and the ramp 18 does not move upwardly even though the lip 80 is moving from the extended position to a pendent position.

If it is desired to change the amount of upward pivotal movement of the ramp 18 (that is, the length of time the holding means 42 is released because of pivoting movement of the lip 80) the adjustment means comprising the movable abutment 138 may be adjusted to engage the forward arm 126 of the first member 120 a greater or less amount of time during downward pivotal movement of the lip 80.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A dockboard assembly comprising; support means, ramp means pivotally connected to said support means for carrying traffic between a dock and an adjacent vehicle, biasing means urging said ramp means to pivot upwardly, releasable holding means operative to act in opposition to said biasing means for restraining said biasing means from raising said ramp means and for allowing said ramp to pivot downwardly in response to a predetermined downward force being applied thereto, a lip pivotally connected to said ramp for movement between an extended position and a pendent position, means for pivoting said lip to said extended position and for locking said lip in said extended position until said lip is disposed upon an adjacent vehicle, and control means responsive to downward pivotal movement of said lip for releasing said holding means to allow said ramp to pivot upwardly.

2. An assembly as set forth in claim 1 wherein said control means includes limit means for preventing the automatic release of said holding means once said ramp means has pivoted upwardly to a predetermined position.

3. An assembly as set forth in claim 2 wherein said releasable holding means includes first and second locking members which coact to prevent said ramp means from being raised and for allowing said ramp means to pivot downwardly in response to said downward force being applied thereto.

4. A dockboard assembly comprising; support means, a ramp pivotally connected at a first end thereof to said support means and extending to a second end, biasing means urging said ramp to pivot upwardly, releasable holding means operative to act in opposition to said biasing means for restraining said biasing means from raising said ramp, a lip pivotally connected to said second end of said ramp for pivotal movement between an extended position and a pendent position, and control means responsive to pivotal movement of said lip for releasing said holding means.

5. An assembly as set forth in claim 4 wherein said control means includes adjustment means for adjusting the amount of pivotal movement of said lip over which said holding means is released.

6. An assembly as set forth in claim 5 wherein said control means includes limit means for preventing the release of said holding means in response to movement of said lip when said ramp has pivoted upwardly to a predetermined position.

7. An assembly as set forth in claim 4 wherein said control means includes limit means for preventing the automatic release of said holding means once said ramp has pivoted upwardly to a predetermined position.

8. An assembly as set forth in claim 4 wherein said control means includes a first member for releasing said holding means and linkage means for moving said first member during a predetermined portion of the pivotal movement of said lip between said extended and pendent positions.

9. An assembly as set forth in claim 4 wherein said holding means includes first and second locking members which coact to prevent said ramp from being raised and for automatically allowing said ramp to pivot downwardly in response to a predetermined downward force being applied thereto.

10. An assembly as set forth in claim 4 including means for pivoting said lip to said extended position and for locking said lip in said extended position until said lip is disposed upon an adjacent vehicle.

11. An assembly as set forth in claim 4 wherein said control means includes a first member pivotally connected to said ramp for releasing said holding means and linkage means operably connected to said lip and cooperable with said first member for pivoting said first member during pivotal movement of said lip.

12. An assembly as set forth in claim 11 wherein said linkage means includes adjustment means for adjusting the amount of movement of said first member in response to movement of said lip.

13. An assembly as set forth in claim 11 wherein said control means includes limit means for preventing the release of said holding means upon movement of said first member once said ramp has pivoted upwardly to a predetermined position.

14. An assembly as set forth in claim 13 wherein said holding means includes first and second locking members which coact to prevent said ramp from being raised and for automatically allowing said ramp to pivot downwardly in response to a predetermined downward force being applied thereto.

15. An assembly as set forth in claim 14 including a lever attached to said first locking member for moving the latter out of locking engagement with said second locking member for allowing said ramp to pivot, said first member having a first end thereof normally engageable with said lever for moving said first locking member out of said locking engagement upon being pivoted by said linkage means.

16. An assembly as set forth in claim 15 wherein said limit means comprises an offset cam portion in said lever which prevents the engagement of said lever by said first end of said first member when said ramp has pivoted upwardly to said predetermined position.

17. An assembly as set forth in claim 16 wherein said linkage means includes adjustment means for adjusting the amount of movement of said first member in response to movement of said lip.

18. An assembly as set forth in claim 17 including manually actuatable means connected to said lever for manually releasing said holding means.

19. An assembly as set forth in claim 18 wherein said first member has a rearwardly extending arm on one side of the pivotal connection thereof to said ramp and a forwardly extending arm on the other side of said pivotal connection, said rearwardly extending arm terminating in said first end and said forwardly extending arm terminating in a second end, a pin extending from said first end for engaging said lever, said linkage means including a first link pivotally connected to said ramp and depending therefrom for pivoting said first member, a second link pivotally interconnecting said lip and said first link for pivoting the latter upon pivotal movement of said lip.

20. An assembly as set forth in claim 19 wherein said adjustment means comprises an abutment movably connected to lower end of said first link and engageable with said first member.

21. An assembly as set forth in claim 20 including a cam surface on said first member which engages said abutment.

22. An assembly as set forth in claim 21 wherein said holding means includes an anchor means pivotally connected to said support means, said second locking member being elongated and including ratchet teeth, said second locking member being pivotally connected to said ramp coaxially with said first member and being movably supported by said anchor means, said first locking member being movably supported by said anchor means and having ratchet teeth on said second locking member, said lever being attached to said first locking member for moving the ratchet teeth thereof into and out of engagement with said ratchet teeth on said second locking member, spring means for urging said first locking member into engagement with said second locking member, said ratchet teeth being angled so that said locking members may move relative to one another as said ramp is pivoted downward and may not move relative to one another in the opposite direction except by movement of said first locking member by said lever, said arms of said first member disposed at an angle between 90 degrees and 180 degrees relative to one another, means for pivoting said lip to said extended position and for locking said lip in said extended position until said lip is disposed upon an adjacent vehicle, and platform means for receiving the end of said lip in said pendent position for supporting said ramp in a stored position.

References Cited

UNITED STATES PATENTS

| | | | |
|---|---|---|---|
| 3,117,332 | 1/1944 | Kelley | 14—71 |
| 3,203,002 | 8/1965 | McGuire | 14—71 |
| 3,249,956 | 5/1966 | Zajac | 14—71 |
| 3,255,478 | 6/1966 | Lambert | 14—71 |
| 3,290,710 | 12/1966 | Whitenack | 14—71 |

JACOB L. NACKENOFF, Primary Examiner